US011856278B2

(12) United States Patent
Yan et al.

(10) Patent No.: US 11,856,278 B2
(45) Date of Patent: Dec. 26, 2023

(54) EMBEDDED MOUNTING BRACKET AND CAMERA ASSEMBLY COMPRISING SAME

(71) Applicant: Hangzhou Hikvision Digital Technology Co., Ltd., Hangzhou (CN)

(72) Inventors: Caisheng Yan, Hangzhou (CN); Yan Wu, Hangzhou (CN); Lei Li, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 107 days.

(21) Appl. No.: 17/759,269

(22) PCT Filed: Sep. 15, 2020

(86) PCT No.: PCT/CN2020/115235
§ 371 (c)(1),
(2) Date: Jul. 26, 2022

(87) PCT Pub. No.: WO2021/147344
PCT Pub. Date: Jul. 29, 2021

(65) Prior Publication Data
US 2023/0069647 A1    Mar. 2, 2023

(30) Foreign Application Priority Data

Jan. 21, 2020 (CN) .......................... 202010072109.1

(51) Int. Cl.
*H04N 23/51* (2023.01)
*F16M 11/04* (2006.01)
(Continued)

(52) U.S. Cl.
CPC ............. *H04N 23/51* (2023.01); *F16M 11/04* (2013.01); *F16M 13/022* (2013.01);
(Continued)

(58) Field of Classification Search
CPC .......... H04N 23/51; H04N 7/18; F16M 11/04; F16M 13/022; F16M 13/027; G03B 17/561
See application file for complete search history.

(56) References Cited

U.S. PATENT DOCUMENTS

2015/0001355 A1    7/2015   Huang
2019/0243218 A1*   8/2019   Wynalda, Jr. ........ G03B 17/561
(Continued)

FOREIGN PATENT DOCUMENTS

CN    201954623    8/2011
CN    203068073    7/2013
(Continued)

OTHER PUBLICATIONS

International Search Report and Written Opinion issued in Corresponding PCT Application No. PCT/CN2020/115235, dated Nov. 27, 2020. (English Translation Provided).

*Primary Examiner* — Amy R Hsu
(74) *Attorney, Agent, or Firm* — NORTON ROSE FULBRIGHT US LLP

(57) ABSTRACT

The present disclosure provides an embedded mounting bracket and camera assembly comprising same. The embedded mounting bracket is used for mounting a camera, and the embedded mounting bracket includes a bracket body and a mounting member. The bracket body includes a bracket side wall, the bracket side wall includes a lower end surface and an upper end surface opposite to the lower end surface, and the upper end surface includes multiple step surfaces with different heights from the lower end surface. The mounting member is detachably assembled to the bracket body for bearing the camera. The mounting member is selectively assembled on the step surfaces with different heights, so as (Continued)

to replaceably assemble at least two cameras with different body heights to the bracket body.

16 Claims, 13 Drawing Sheets

(51) Int. Cl.
  *G03B 17/56* (2021.01)
  *F16M 13/02* (2006.01)
  *H04N 7/18* (2006.01)
(52) U.S. Cl.
  CPC ......... *F16M 13/027* (2013.01); *G03B 17/561* (2013.01); *H04N 7/18* (2013.01)

(56) References Cited

U.S. PATENT DOCUMENTS

| | | | |
|---|---|---|---|
| 2019/0369678 A1* | 12/2019 | Park | H04N 23/51 |
| 2020/0021720 A1* | 1/2020 | Wang | H04N 23/55 |
| 2020/0154006 A1* | 5/2020 | Steffanson | H04N 7/183 |
| 2022/0303445 A1* | 9/2022 | Skaff | H04N 23/56 |

FOREIGN PATENT DOCUMENTS

| | | |
|---|---|---|
| CN | 104369015 | 2/2015 |
| CN | 204629030 | 9/2015 |
| CN | 206932312 | 1/2018 |
| CN | 209484176 | 10/2019 |

\* cited by examiner

EMBEDDED MOUNTING BRACKET AND CAMERA ASSEMBLY COMPRISING SAME

CROSS REFERENCE TO RELATED APPLICATIONS

The present application is a national phase application under 35 U.S.C. § 371 of International Application No. PCT/CN2020/115235, filed Sep. 15, 2020, which claims the benefit of priority to Chinese patent application No. 202010072109.1, filed with the China National Intellectual Property Administration on Jan. 21, 2020 and entitled "Embedded mounting bracket and camera assembly comprising same", each of which are incorporated herein by reference in their entirety.

TECHNICAL FIELD

The present application relates to the technology field of video surveillance, in particular to an embedded mounting bracket and a camera assembly comprising same.

BACKGROUND

At present, the mounting methods of cameras mainly include: hoisting, wall mounting, ceiling mounting, embedded mounting, etc. For the embedded mounting, at least a part of the camera body needs to be embedded into the interior of a body to be mounted such as ceiling by using the embedded mounting bracket to realize the embedded mounting. The camera body height that some embedded mounting brackets can match is fixed, which leads to the development of a new embedded bracket for every new camera of a new size, which increases the total development cost.

SUMMARY

The present disclosure provides an embedded mounting bracket and camera assembly comprising same.

The present disclosure provides an embedded mounting bracket for mounting a camera, the embedded mounting bracket includes: a bracket body, including a bracket side wall, the bracket side wall including a lower end surface and an upper end surface opposite to the lower end surface, the upper end surface includes multiple step surfaces with different heights from the lower end surface; and a mounting member, which is detachably assembled to the bracket body for bearing the camera, and the mounting member can be selectively assembled on the step surface with different heights, so as to replaceably assemble at least two kinds of cameras with different body heights to the bracket body.

The present disclosure provides a camera assembly, including: an embedded mounting bracket; and a camera detachably mounted to the embedded mounting bracket.

The bracket body of the embedded mounting bracket of the embodiments of the present disclosure is provided with multiple step surfaces with different heights, so that the mounting member can be assembled to the step surfaces of a corresponding height according to the height of the camera body, so that the embedded mounting bracket can be applied to many cameras with different body heights, which can reduce the development cost in some embodiments.

DETAILED DESCRIPTION

Figure 1:
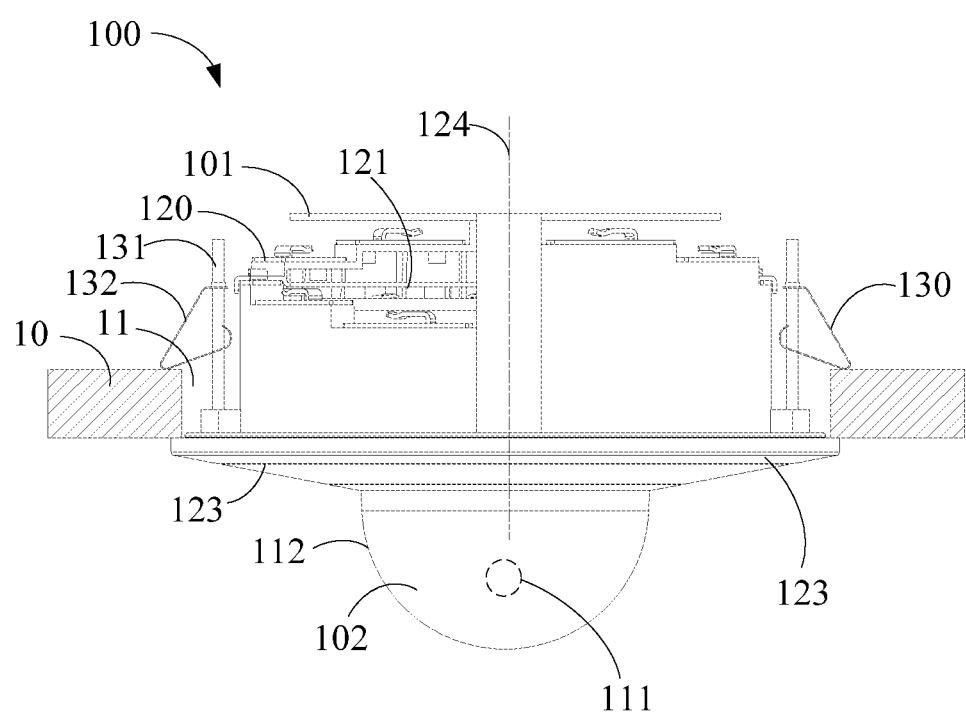
FIG. 1 is a schematic assembly diagram of an embodiment of a camera assembly of the present disclosure.

Exemplary embodiments will be described in detail herein, examples of which are illustrated in the drawings. When the following description refers to the drawings, the same numerals in different drawings refer to the same or similar elements unless otherwise indicated. The implementations described in the exemplary embodiments below are not intended to represent all implementations consistent with this disclosure. Rather, they are merely examples of apparatus and methods consistent with some aspects of the present disclosure as recited in the appended claims.

The terms used in the present disclosure is for the purpose of describing particular embodiments only and is not intended to limit the present disclosure. Unless otherwise defined, technical or scientific terms used in the present disclosure should have the ordinary meaning as understood by one of ordinary skill in the art to which this disclosure belongs. As used in the present disclosure and in the claims, "first," "second," and similar terms do not represent any order, quantity, or importance, but are merely used to distinguish the various components. Likewise, "a" or "an" and the like do not represent a quantitative limitation, but rather represent the presence of at least one. "Multiple" or "several" means at least two. Unless otherwise indicated, terms such as "upper end" and "lower end" are for convenience of description only and are not limited to one position or one spatial orientation. Words like "include" or "comprise" mean that the elements or items appearing before "include" or "comprise" cover the elements or items appearing after "include" or "comprise" and their equivalents, and do not exclude other elements or items. "Connection" or "connected with" and similar words are not limited to physical or mechanical connections, but may include electrical connections, whether direct or indirect.

The singular forms of "a", "said" and "the" used in this application and claims can include the singular and plural forms, unless the context clearly indicates other meanings. It should also be understood that the term "and/or" as used herein refers to any or all possible combinations of one or more associated listed items.

The embedded mounting bracket of the embodiment of the present disclosure is used for mounting a camera, and the embedded mounting bracket includes a bracket body and a mounting member. The bracket body includes a bracket side wall, the bracket side wall includes a lower end surface and an upper end surface opposite to the lower end surface, and the upper end surface includes multiple step surfaces with different heights from the lower end surface. The mounting member is detachably assembled to the bracket body for bearing the camera. The mounting member is selectively assembled on the step surfaces with different heights, so as to replaceably assemble at least two cameras with different body heights to the bracket body.

The bracket body of the embedded mounting bracket of the embodiment of the present disclosure is provided with multiple step surfaces with different heights, so that the mounting member can be assembled to the step surfaces of a corresponding height according to the body height of the camera, so that the embedded mounting bracket can be applied to many cameras with different body heights. Therefore, in some embodiments, the designed cameras of new sizes can still use the previous embedded mounting brackets, so that it is not necessary to design new embedded mounting brackets, which can reduce the development cost. In addition, in some embodiments, when a user replaces a camera with a new size, an old embedded mounting bracket that is already in use can be used, and there is no need to purchase an additional embedded mounting bracket, thereby saving the user's expenses and reducing the cost for the user to replace the camera. And the user does not need to disassemble the old-size embedded mounting bracket and re-mount the new-size embedded mounting bracket, and the camera can be replaced through the mounting member, so that the user can replace the camera conveniently, with simple operation and better usability. Moreover, in some embodiments, the same embedded mounting brackets can be used for some cameras with different sizes, so that manufacturers can produce less varieties of embedded mounting brackets and develop fewer molds, thereby greatly saving mold opening and fabricating cost, and facilitate storage.

The camera assembly of the embodiment of the present disclosure includes an embedded mounting bracket and a camera detachably mounted to the embedded mounting bracket. The camera assembly includes the embedded mounting bracket described above, so the camera assembly can have at least one of the above-mentioned benefits.

FIG. 1 is a schematic assembly diagram of an embodiment of a camera assembly 100 of the present disclosure. The camera assembly 100 includes an embedded mounting bracket 101 and a camera 102. The embedded mounting bracket 101 is used to mount the camera 102. In some embodiments, the embedded mounting bracket 101 is embedded in a to-be-mounted body 10, such as a ceiling, etc. The to-be-mounted body 10 is provided with a to-be-mounted hole 11, and the embedded mounting bracket 101 is inserted into the to-be-mounted body 11 from one side of the to-be-mounted body 10, fixed to the to-be-mounted body 10, and embedded in the to-be-mounted body 10. The camera 102 is detachably mounted to the embedded mounting bracket 101, and is mounted to the to-be-mounted body 10 through the embedded mounting bracket 101. In some embodiments, the camera 102 includes a dome camera, or other type of camera.

Figure 2:
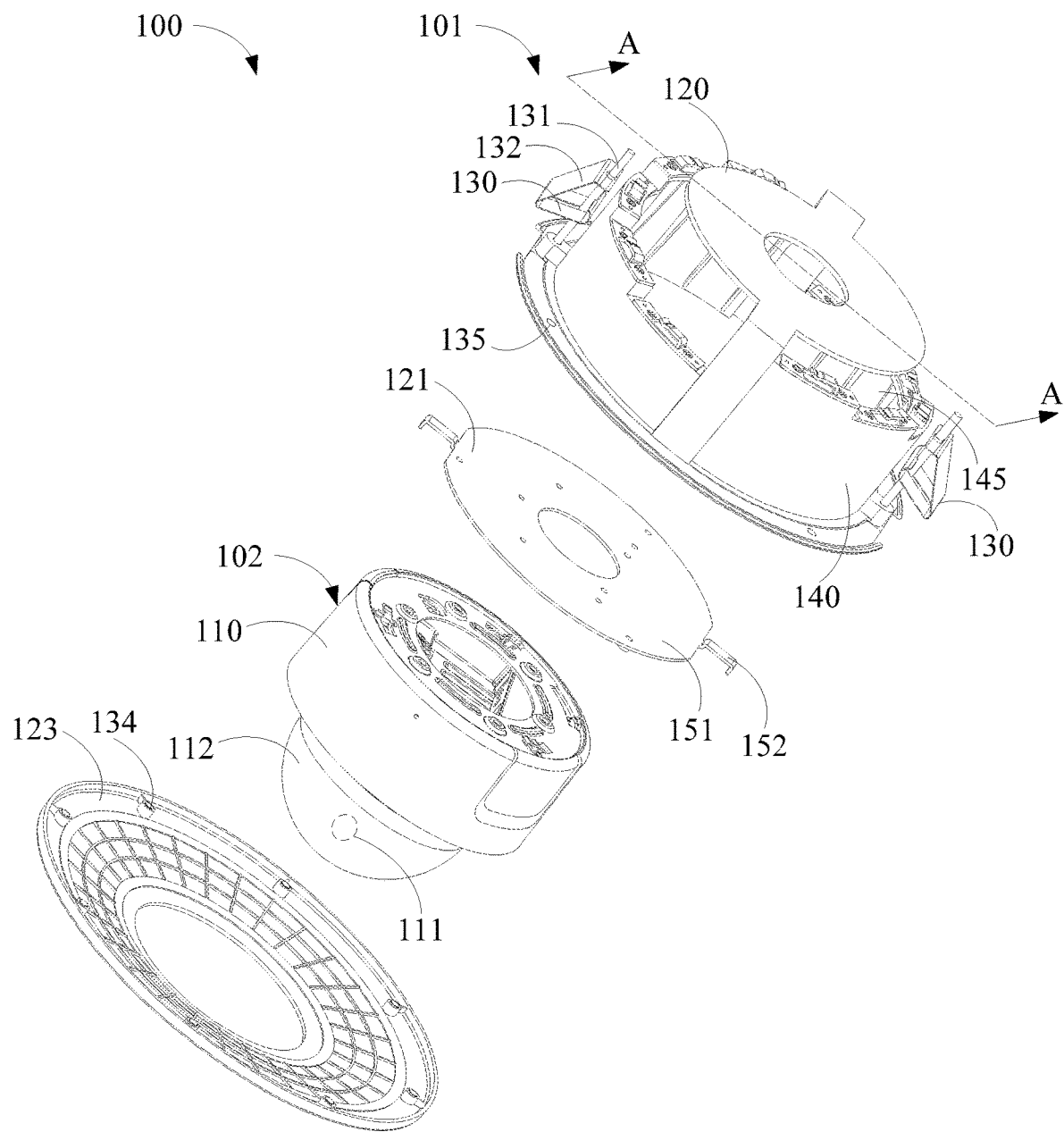
FIG. 2 is an exploded perspective diagram of a camera assembly shown in FIG. 1.

FIG. 2 is an exploded perspective diagram of a camera assembly 100 shown in FIG. 1. The camera 102 includes a body 110, a lens 111 provided on the body 110, and a lens cover 112 provided on the body 110 and covering the lens 111. Referring to FIG. 1 and FIG. 2, in some embodiments, the body 110 of the camera 102 is received in the embedded mounting bracket 101 and embedded in the to-be-mounted body 10. The lens 111 is located outside the embedded mounting bracket 101 and outside the to-be-mounted body 10. The lens cover 112 is at least partially located outside the embedded mounting bracket 101 and outside the to-be-mounted body 10.

The embedded mounting bracket 101 includes a bracket body 120 and a mounting member 121. The bracket body 120 is embedded in the to-be-mounted body 10. In some embodiments, the bracket body 120 includes a bracket mounting assembly 130, and the bracket mounting assembly 130 is fixedly matched with the to-be-mounted body 10. In some embodiments, the bracket mounting assembly 130 includes a mounting clip 132 and an adjustment screw 131 passing through the mounting clip 132. The bottom end of the mounting clip 132 is separated from the bottom end of the adjusting screw 131. The mounting clip 132 has elasticity and protrudes outward from the adjusting screw 131 toward the bracket body 120. The mounting clip 132 extends from the adjusting screw 131 to the edge of the to-be-mounted hole 11 beyond the to-be-mounted hole 11.

When the bracket body 120 is mounted to the to-be-mounted body 10, the mounting clip 132 squeezes into the to-be-mounted hole 11 from one side of the to-be-mounted hole 11, is pushed by the inner wall of the to-be-mounted hole 11, and elastically deforms in the direction of the adjusting screw 131. After reaching the other side of the to-be-mounted hole 11, the mounting clip 132 returns to elastically press against the other side edge of the to-be-mounted hole 11. The adjusting screw 131 can be rotated to make the mounting clip 132 stably press against the to-be-mounted body 10. The adjusting screw 131 can be rotated to adjust the distance between the bottom end of the mounting clip 131 and the bottom end of the adjusting screw 131, so as to be suitable for the to-be-mounted body 10 with different thicknesses.

In some embodiments, the embedded mounting bracket 101 includes at least two bracket mounting assemblies 130. In the illustrated embodiment, the embedded mounting bracket 101 is provided with a pair of bracket mounting assemblies 130, and the pair of bracket mounting assemblies 130 are arranged symmetrically with respect to the centerline 124 of the embedded mounting bracket 101. A pair of bracket mounting assemblies 130 are locked with the to-be-mounted body 10 from both sides of the embedded mounting bracket 101.

The mounting member 121 is detachably assembled to the bracket body 120 for bearing the camera 102. The camera 102 is detachably assembled to a mounting member 121, and the mounting member 121 is assembled to the bracket body 120, thereby assembling the camera 102 to the to-be-mounted body 10. When replacing the camera 102 subsequently, the camera 102 can be replaced without removing the bracket body 120 from the to-be-mounted body 10, removing the mounting member 121 from the bracket body 120, and removing the camera 102 from the mounting member 121, the operation is simple and the usability is stronger. In some embodiments, the mounting member 121 and the camera 102 may be assembled by screws (not shown). The body 110 of the camera 102 is assembled to the mounting member 121. In some embodiments, the mounting member 121 is substantially plate-shaped, and the camera 102 is mounted on the lower surface of the mounting member 121. In some embodiments, the mounting member 121 may comprise a metallic material.

The embedded mounting bracket 101 includes a decorative cover 123, which is covered under the bracket body 120 and covers the to-be-mounted hole 11. The decorative cover 123 is substantially annular and surrounds the lens cover 112. In some embodiments, the decorative cover 123 is arranged with multiple magnets 134, and the bracket body 120 is provided with multiple adsorption bases 135. When the decorative cover 123 is closed, the magnet 134 and the adsorption base 135 of the bracket body 120 are adsorbed and fixed to each other, so that the assembly is simple, convenient and easy to operate. In some embodiments, multiple magnets 134 are arranged in the circumferential direction of the decorative cover 123, which may be evenly arranged, and the positions of the multiple adsorption bases 135 are arranged corresponding to the positions of the multiple magnets 134.

Figure 3:
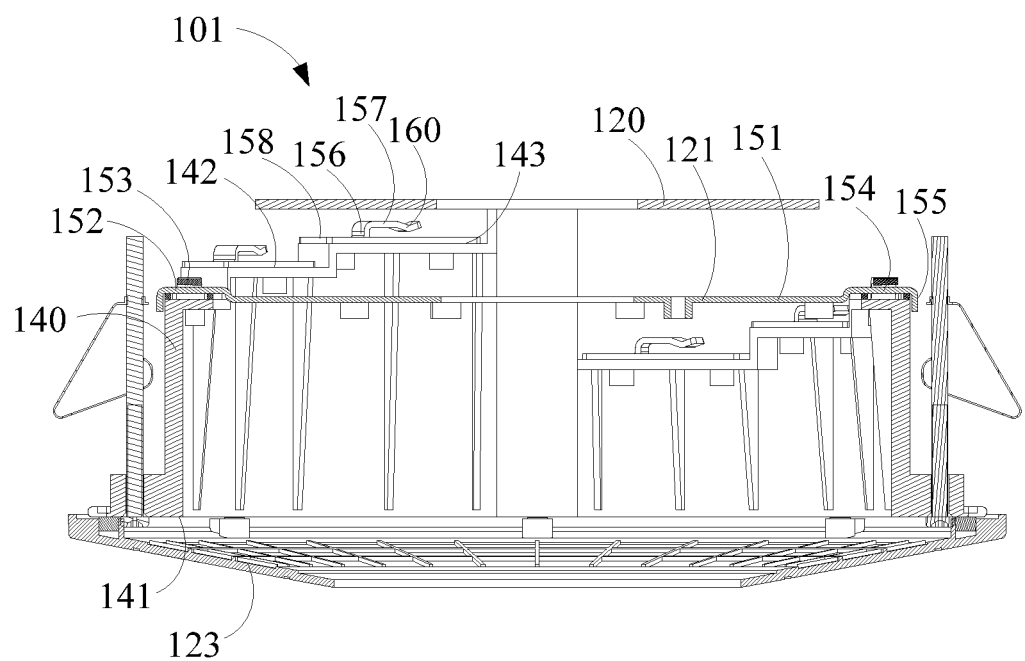
FIG. 3 is a cross-sectional diagram along the line A-A of an embedded mounting bracket of a camera assembly shown in FIG. 2.

FIG. 3 is a cross-sectional diagram along the line A-A of an embedded mounting bracket of a camera assembly shown in FIG. 2. Referring to FIG. 2 and FIG. 3, the bracket body 120 includes a bracket side wall 140 including a lower end surface 141 and an upper end surface 142 opposite to the lower end surface 141. The upper end surface 142 includes multiple step surfaces 143 with different heights from the lower end surface 141. The mounting member 121 can be selectively assembled on the step surfaces 143 with different heights, so as to replaceably assemble at least two cameras 102 with different body heights to the bracket body 120.

The bracket body 120 of the embedded mounting bracket 101 of the embodiment of the present disclosure is provided with multiple step surfaces 143 with different heights, so that the mounting member 121 can be assembled to the step surface 143 of a corresponding height according to the body height of the camera 102, so that the embedded mounting bracket 101 can be applied to many cameras 102 with different body heights. Therefore, in some embodiments, the designed cameras 102 of new sizes can still use the previous embedded mounting brackets 101, so that it is not necessary to design new embedded mounting brackets 101, which can reduce the development cost. In addition, in some embodiments, when a user replaces a camera 102 with a new size, an old embedded mounting bracket 101 that is already in use can be used, and there is no need to purchase an additional embedded mounting bracket 101, thereby saving the user's expenses. And the user does not need to disassemble the old-size embedded mounting bracket 101 and re-mount the new-size embedded mounting bracket 101, and the camera 102 can be replaced through the mounting member 121, so that the user can replace the camera 102 conveniently. Moreover, in some embodiments, the same embedded mounting brackets 101 can be used for some cameras 102 with different sizes, so that manufacturers can produce less varieties of embedded mounting brackets 101 and develop fewer molds, thereby greatly saving mold opening and fabricating cost, and facilitate storage.

In some embodiments, a bracket side wall 140 is an annular wall surrounded by a receiving space 145 for receiving the body 110 of the camera 102. When the height of the body 110 of the camera 102 is relatively high, the mounting member 121 is assembled to the step surface 143 with a relatively high height. On the contrary, when the height of the body 110 of the camera 102 is relatively low, the mounting member 121 is assembled to the step surface 143 with a relatively low height, in this way, the body 110 of the camera 102 is received in the receiving space 145, and the lens 111 is exposed outside the bracket body 120, thereby adapting to cameras 102 with different body heights. A decorative cover 123 covers a lower end surface 141 of the bracket side wall 140.

Figure 4:
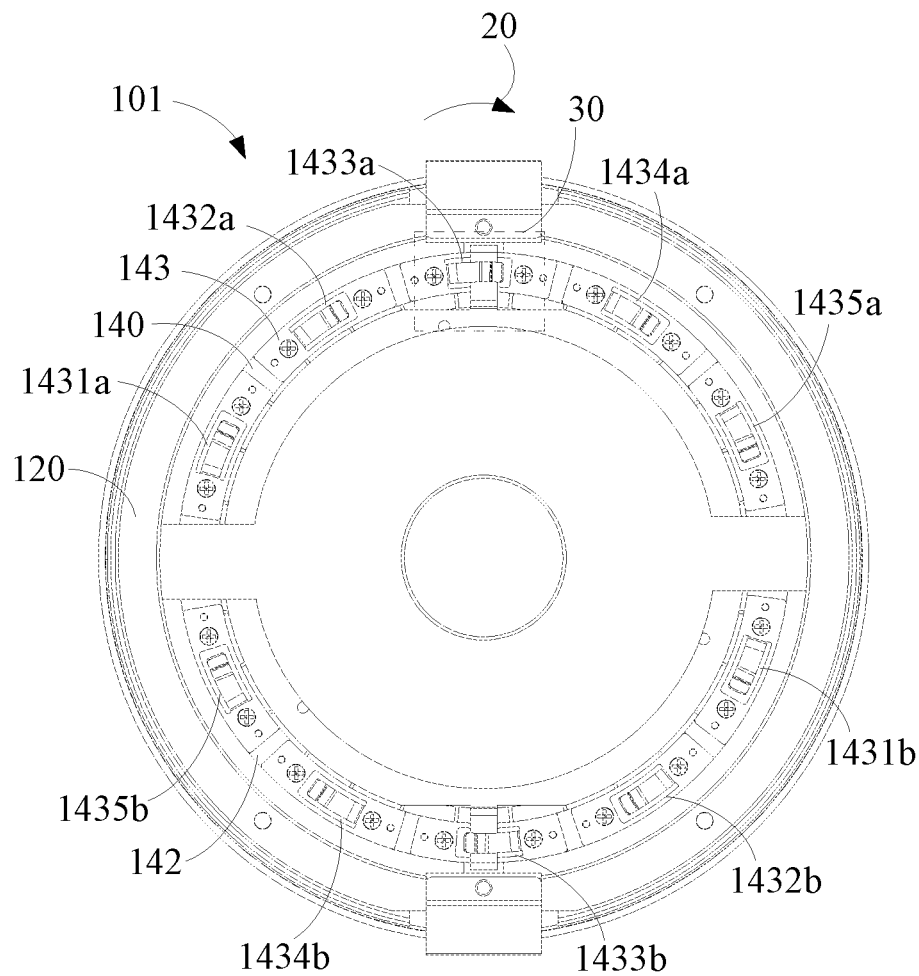
FIG. 4 is a top view of an embedded mounting bracket shown in FIG. 1.
Figure 5:
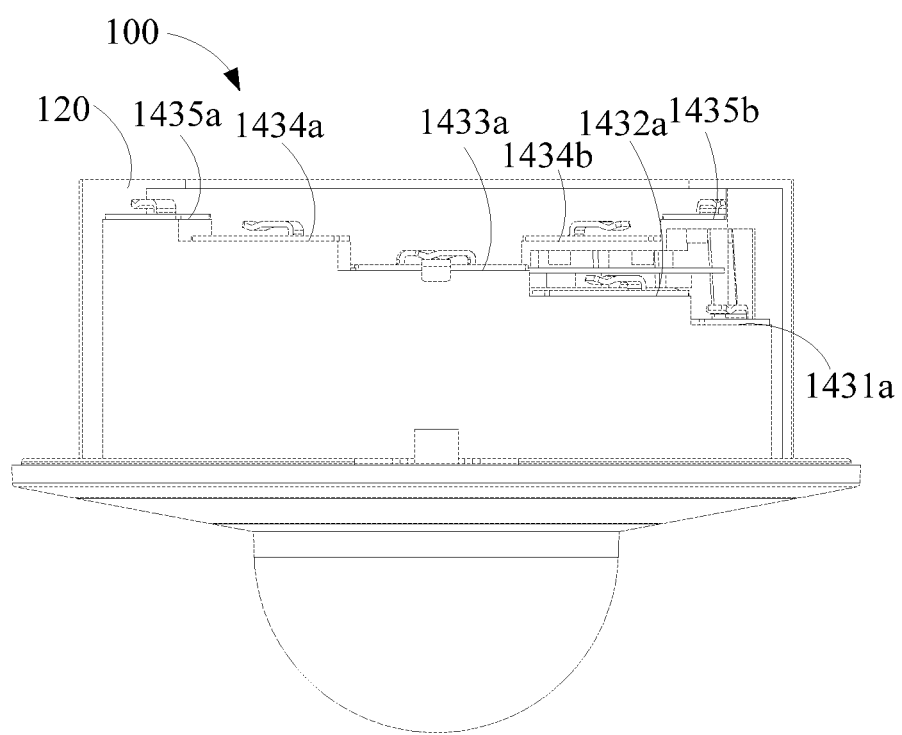
FIG. 5 is a schematic side diagram of a camera assembly shown in FIG. 1.

FIG. 4 is a top view of an embedded mounting bracket 101. FIG. 5 is a schematic side diagram of a camera assembly 100 from another angle, with the bracket mount assembly 130 not shown. Referring to FIG. 4 and FIG. 5, in some embodiments, the upper end surface 142 of the bracket side wall 140 includes multiple sets of step surfaces 143, and each set of step surfaces 143 includes at least two step surfaces 143 having the same height from the lower end surface 141. The heights of the multiple sets of step surface 143 from the lower end surface 141 are different, and the mounting member 121 can be selectively assembled to one of the multiple sets of step surfaces 143, so that the mounting member 121 can be assembled and matched with at least two step surfaces 143, and the assembly can be more stable. In the illustrated embodiment, the heights of a step surface 1431a and a step surface 1431b are equal, forming a set of step surfaces; similarly, the step surface 1432a and the step surface 1432b are a set of step surfaces; the step surface 1433a and the step surface 1433b are a set of step surfaces; the step surface 1434a and the step surface 1434b are a set of step surfaces; the step surface 1435a and the step surface 1435b are a set of step surfaces. The heights of the step surfaces with different sets are different.

In the illustrated embodiment, five sets of step surfaces 143 are provided, but it is not limited thereto. In other embodiments, two, three, four or more than five sets of step surfaces 143 may be provided. In the illustrated embodiment, each set of step surfaces 143 includes two step surfaces 143. In other embodiments, each set of step surfaces 143 may include three or more step surfaces 143.

Continuing to refer to FIG. 4, multiple step surfaces 143 are arranged in a circumferential direction, and the mounting member 121 is rotatably assembled to the step surfaces 143. The bracket side wall 140 extends along the circumferential direction, and multiple step surfaces 143 may be sequentially arranged on the upper end surface 142 along the circumferential direction. In some embodiments, multiple sets of step surfaces 143 are arranged along the circumferential direction, and the mounting member 121 is rotatably assembled to the step surfaces 143, which facilitates the arrangement of multiple sets of step surfaces 143, and the rotating mounting manner is simple and easy.

In some embodiments, each set of step surfaces 143 includes at least one pair of step surfaces 143 symmetrically distributed in the radial direction, and each set of step surfaces 143 can support the mounting member 121 in a balanced and symmetrical manner (as shown in FIG. 3), so that the mounting is relatively smooth. In some embodiments, each set of stepped surfaces 143 includes a pair of step surfaces 143 symmetrically distributed in the radial direction. For example, the step surface 1431a and the step surface 1431b in FIG. 4 are symmetrically distributed in the radial direction; the step surface 1432a and the step surface 1432b are symmetrically distributed in the radial direction; the step surface 1433a and the step surface 1433b are symmetrically distributed in the radial direction; the step surface 1434a and the step surface 1434b are symmetrically distributed in the radial direction; and the step surface 1435a and the step surface 1435b are symmetrically distributed in the radial direction. In some embodiments, at least one set of stepped surfaces 143 includes two or more pair of step surfaces 143 symmetrically distributed in the radial direction. In some embodiments, referring to FIG. 3, the rotation angle of the mounting member 121 is less than or equal to 180 degrees, so as to reduce or avoid the occurrence of wire throwing, wire winding, etc.

In some other embodiments, the height of each step surface 143 is different from that of other step surfaces 143, and the mounting member 121 is fixed on one of the step surfaces 143 every time.

Figure 6:
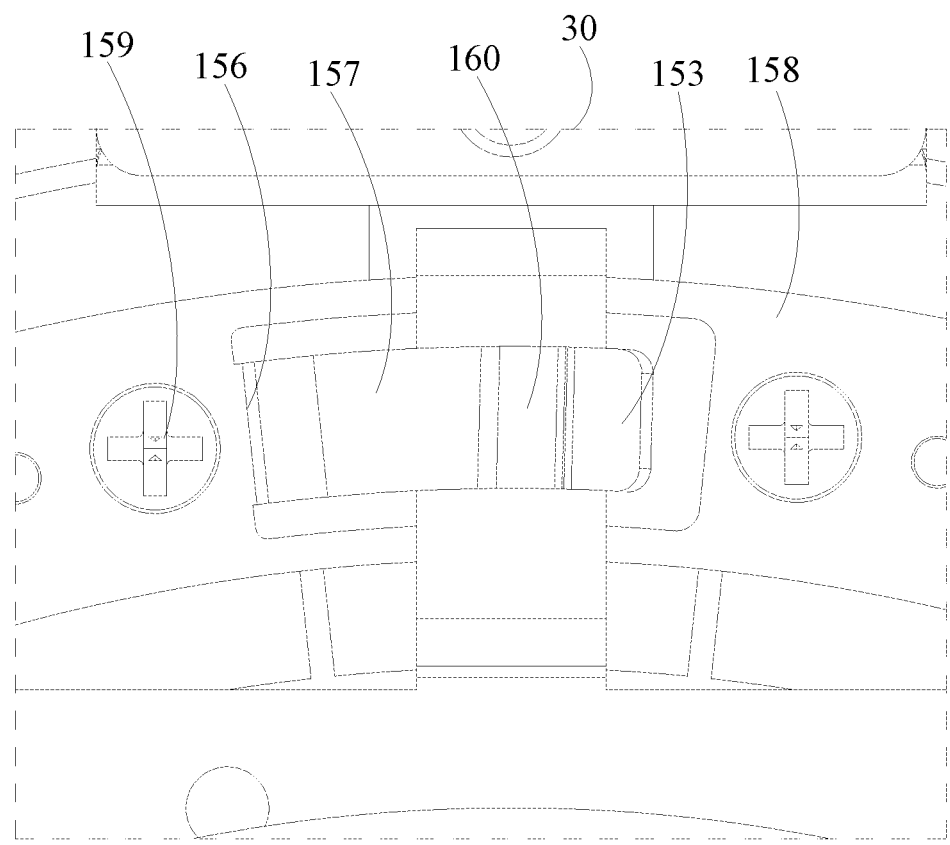
FIG. 6 is a partial enlarged diagram of an embedded mounting bracket shown in FIG. 4.

FIG. 6 is a partial enlarged diagram of a partial area 30 of FIG. 4. Referring to FIG. 2, FIG. 3 and FIG. 6, in some embodiments, the mounting member 121 includes a mounting body 151 for fixedly mounting the camera 102 and a locking part 152 extending outward from the mounting body 151. The body 110 of the camera 102 is detachably mounted to the mounting body 151, and the locking part 152 is mounted on the step surface 143. The step surface 143 is provided with a locking fastener 153. The locking fastener 153 locks the locking part 152 of the mounting member 121, so that the mounting member 121 can be easily mounted and removed, and the mounting member 121 can be stably assembled to the step surface 143, and the structure is simple, easy to operate. In some embodiments, the locking fastener 153 clamps the locking part 152 to facilitate mounting and removing.

In some embodiments, the locking member 153 includes a connecting part 156 extending from the step surface 143 in a direction away from the step surface 143, and a clamping part 157 that is bent from the connecting part 156 and extends along one side of the connecting part. The locking part 152 of the mounting member 121 is clamped between the clamping part 157 and the step surface 143, so that the holding manner is convenient for assembly and disassembly. The locking part 152 can be inserted between the clamping part 157 and the step surface 143 along with the rotation of the mounting member 121. The clamping part 157 extends along the step surface 143. The clamping part 157 can be parallel to the step surface 143 or extend obliquely with respect to the step surface 143. In some embodiments, the clamping part 157 may be inclined in a direction away from the connecting part 156 and in a direction close to the step surface 143, so that the locking part 152 can be better clamped. In some embodiments, the clamping part 157 includes a convex part 160 protruding towards the step surface 143 at an end facing away from the connecting part 156. The convex part 160 abuts against the locking part 152 and can better clamp the locking part 152.

In some embodiments, the locking fastener 153 includes a lock mounting portion 158, the lock mounting portion 158 is fixed to the step surface 143, and the connecting part 156 extends from the lock mounting portion 158. In some embodiments, the lock mounting portion 158 can be fixed on the step surface 143 by fixing screws 159. In some embodiments, the lock mounting portion 158, the connecting part 156 and the clamping part 157 are integrally formed and may be made of metal.

Referring to FIG. 4, in some embodiments, the extending direction of a lock fastener 153 provided on the multiple step surfaces 143 is along the circumferential direction. The extension direction of the clamping part 157 of the multiple lock members 153 is along the circumferential direction, and the connecting part 156 is connected to the same end of the clamping part 157, so that the mounting member 121 can be rotated in one direction and assembled on the step surfaces 143 with different heights. The mounting member 121 can be rotated from one end of the clamping part 157 connected to the connecting part 156 to the other end, for example, rotated along the direction 20 in FIG. 4. After passing over the lock fastener 153, the mounting member can be rotated in the opposite direction and clamped into the lock member 153. In this way, the mounting member is mounted on the step surface 143. The mounting member 121 can be removed by rotating in the direction 20.

Referring to FIG. 3, in some embodiments, the locking part 152 includes a support part 154 extending from the mounting body 151 and a limit part 155 that is bent and extends from the support part 154. The support part 154 of the locking part 152 is clamped to the lock member 153, and the limit part 155 is limited to the outside of the bracket side wall 140, which is limited and matched with the bracket side wall 140 to limit the position of the mounting member 121. The support part 154 extends laterally outward from the mounting body 151, and the limit part 155 extends longitudinally downward from the support part 154. In some embodiments, the support part 154 extends substantially horizontally, and the limit part 155 extends substantially vertically.

In some embodiments, the mounting member 121 is provided with at least two locking parts 152. The number of the locking parts 152 is the same as the number of the step surfaces of a set of step surfaces 143, and the relative positions of at least two locking parts 152 are consistent with the relative positions of the multiple step surfaces of a set of step surfaces 143, so that at least two locking parts 152 are respectively assembled to the corresponding step surfaces 143 of a set of step surfaces 143, so that the assembly can be performed relatively smoothly. In some embodiments, the mounting member 121 includes at least one pair of locking parts 152 symmetrically distributed in the radial direction. In the illustrated embodiment, the mounting member 121 includes a pair of locking parts 152 symmetrically distributed in the radial direction. In other embodiments, the mounting member 121 may include two or more pairs of locking parts 152 symmetrically distributed in the radial direction.

Figure 7:
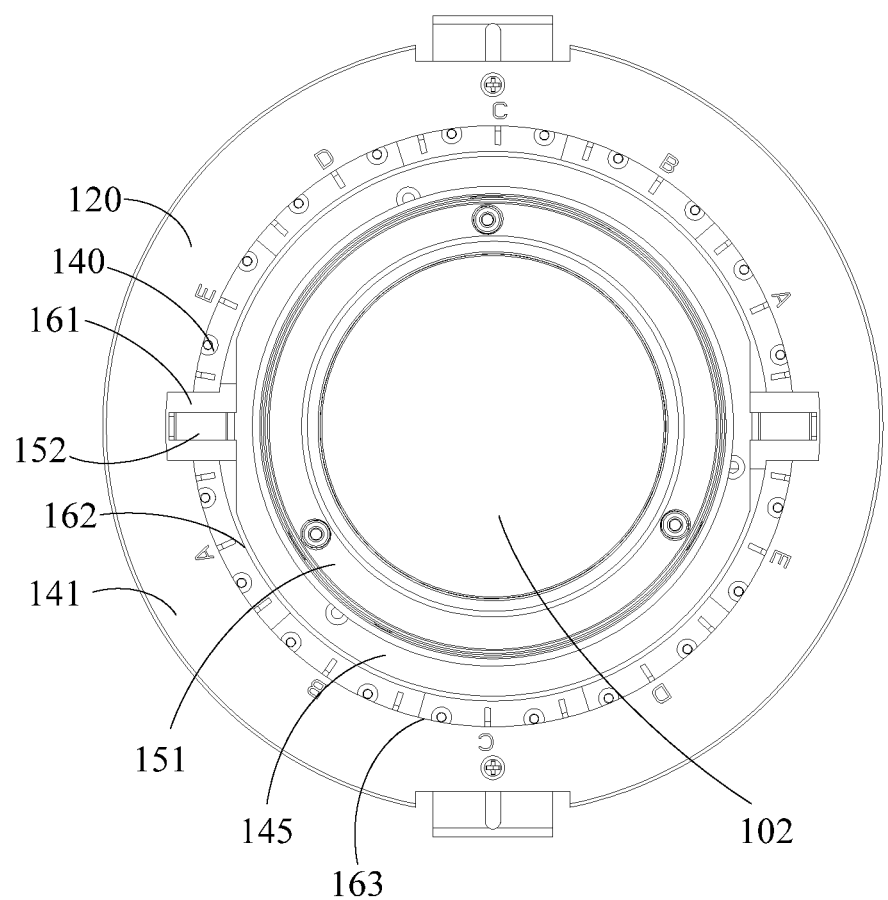
FIG. 7 is a bottom view of a state of a bracket body and a mounting member shown in FIG. 2.

FIG. 7 is a bottom view of a state of a bracket body 120 and a mounting member 121. The bracket body 120 includes a guide groove 161, which penetrates through the upper end surface 142 (shown in FIG. 3) and the lower end surface 141 of the bracket side wall 140 and penetrates through the inner surface 162 of the bracket side wall 140. The mounting body 151 is located inside the bracket side wall 140, and the size of the guide groove 161 is configured to allow the locking part 152 of the mounting member 121 to move along the guide groove 161 from the lower end surface 141 to the upper end surface 142. The mounting body 151 enters the receiving space 145 surrounded by the bracket side wall 140 from the inner side of the bracket side wall 140, and brings the camera 102 into the receiving space 145. The locking part 152 extends laterally beyond the receiving space 145 and laterally extends beyond the bracket side wall 140. The locking part 152 is aligned with the guide groove 161, and moves from the guide groove 161 to the upper end surface 142 of the bracket side wall 140, so as to move above the step surface 143 (as shown in FIG. 3). The size of the guide groove 161 in the circumferential direction is larger than the size of the locking part 152 in the circumferential direction. The number of the guide grooves 161 is the same as the number of the locking parts 152. The relative positions of the multiple guide grooves 161 are consistent with the relative positions of the multiple locking parts 152.

In some embodiments, the guide groove 161 penetrates through the outer surface 163 of the bracket side wall 140, and the size of the guide groove 161 is configured to allow the locking part 152 to extend from the guide groove 161 out of the bracket side wall 140. The locking part 152 extends out of the bracket side wall 140, and the guide groove 161 penetrates through the outer surface 163 of the bracket side wall 140, so that the locking part 152 can be moved to the top of the step surface 143, so that the length of the locking part 152 can be long enough to assemble with the step surface 143 stably, and the locking part 152 can be better locked to the locking member 153. In some embodiments, the locking part 152 includes a limit part 155, and the guide groove 161 penetrates through the outer surface 163 of the bracket side wall 140, so that the limit part 155 can be limited outside the bracket side wall 140 through the guide groove 161, so that the limit part 155 can be limited outside the bracket side wall 140.

Figure 8:
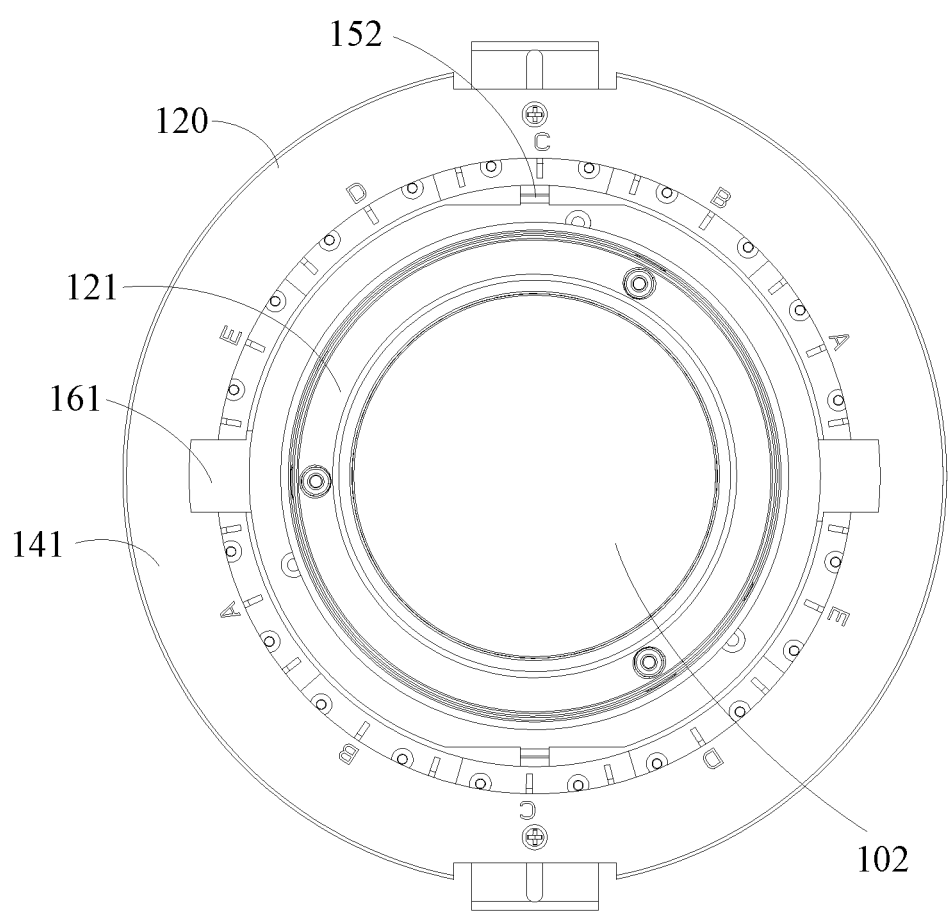
FIG. 8 is a bottom view of another state of a bracket body and a mounting member shown in FIG. 2.

FIG. 8 is a bottom view of another state of a bracket body 120 and a mounting member 121. The locking part 152 of the mounting member 121 moves from the guide groove 161 to the upper end surface 142 of the bracket side wall 140 (as shown in FIG. 3), and then rotates relative to the bracket body 120 to lock on the corresponding step surface 143 (as shown in FIG. 3), in this way, the mounting member 121 is assembled to the bracket body 120, so as to realize the mounting of the camera 102. In the embodiment shown in FIG. 8, the lower end surface 141 of the bracket body 120 is marked with scales, such as "A", "B", "C", "D", and "E", which are used to mark different mounting heights, correspond to different step surface heights, and mount cameras 102 with different body heights. In one embodiment, the mounting member 121 rotates counterclockwise until the locking part 152 is aligned with the corresponding scale position, and then rotated in the opposite direction, so that the locking part 152 is locked into the locking member 153. In another embodiment, the mounting member 121 rotates clockwise until the locking part 152 is aligned with the corresponding scale position, and then rotated in the opposite direction.

Figure 9:
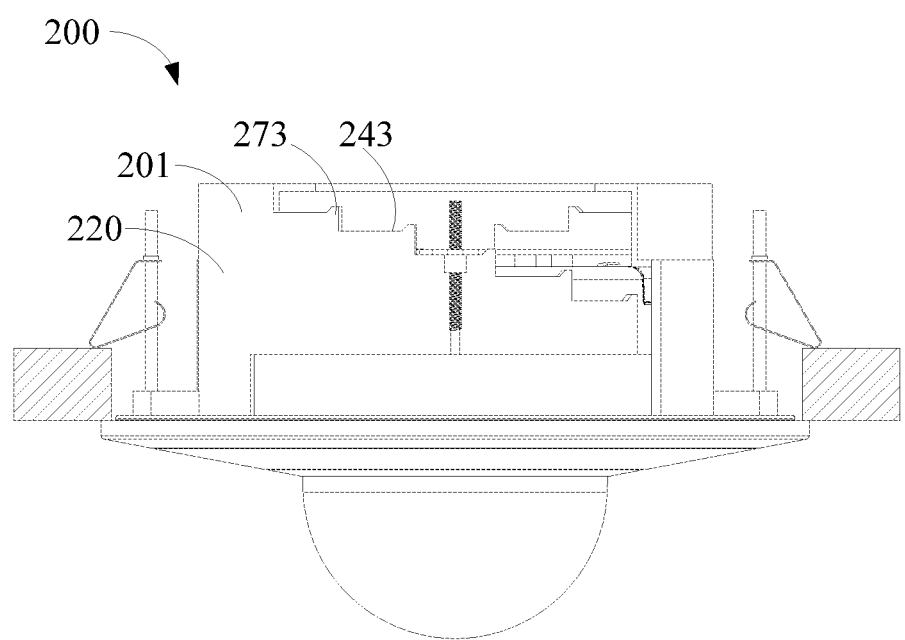
FIG. 9 is a schematic assembly diagram of another embodiment of a camera assembly of the present disclosure.
Figure 10:
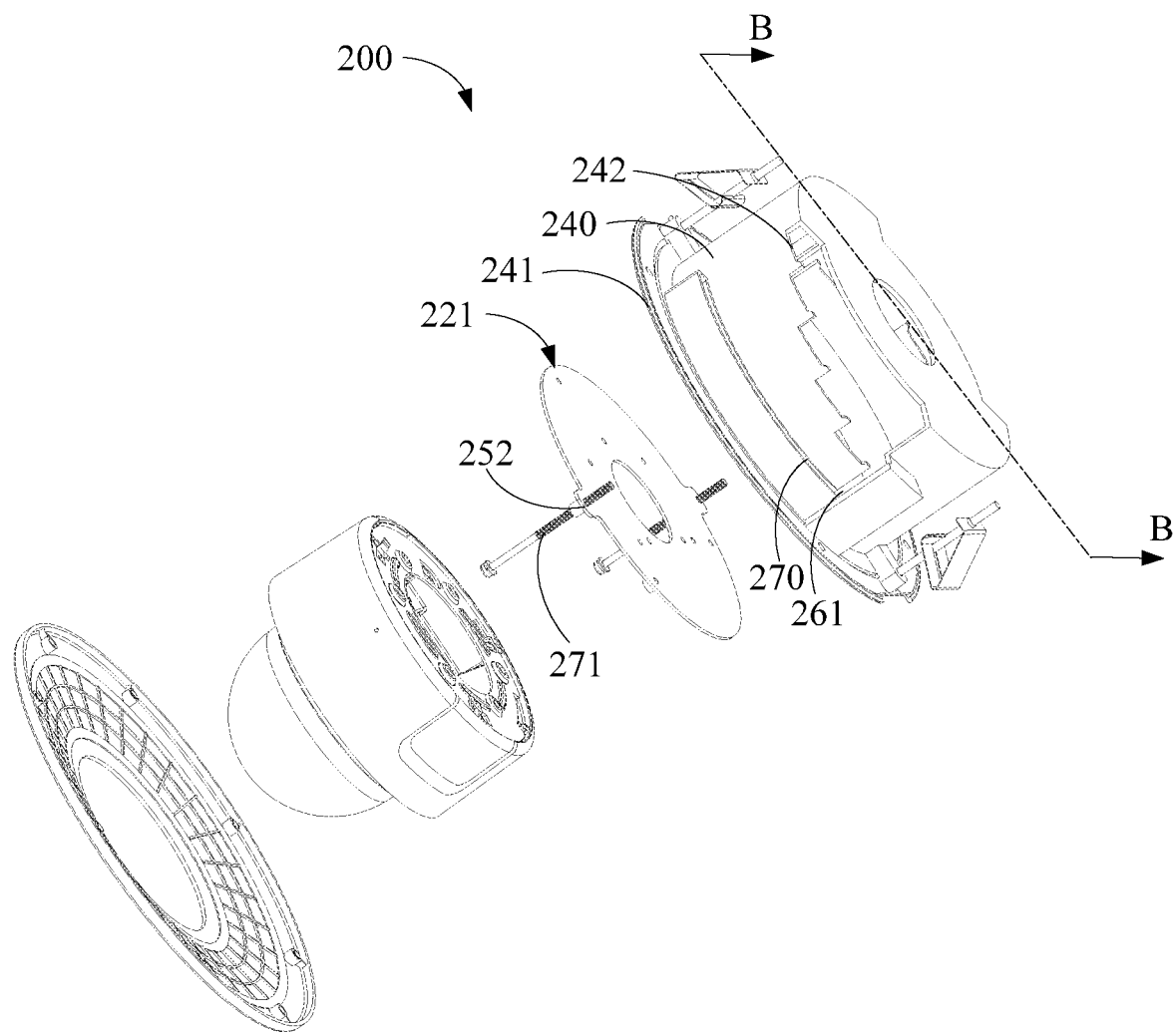
FIG. 10 is an exploded perspective diagram of a camera assembly shown in FIG. 9.
Figure 11:
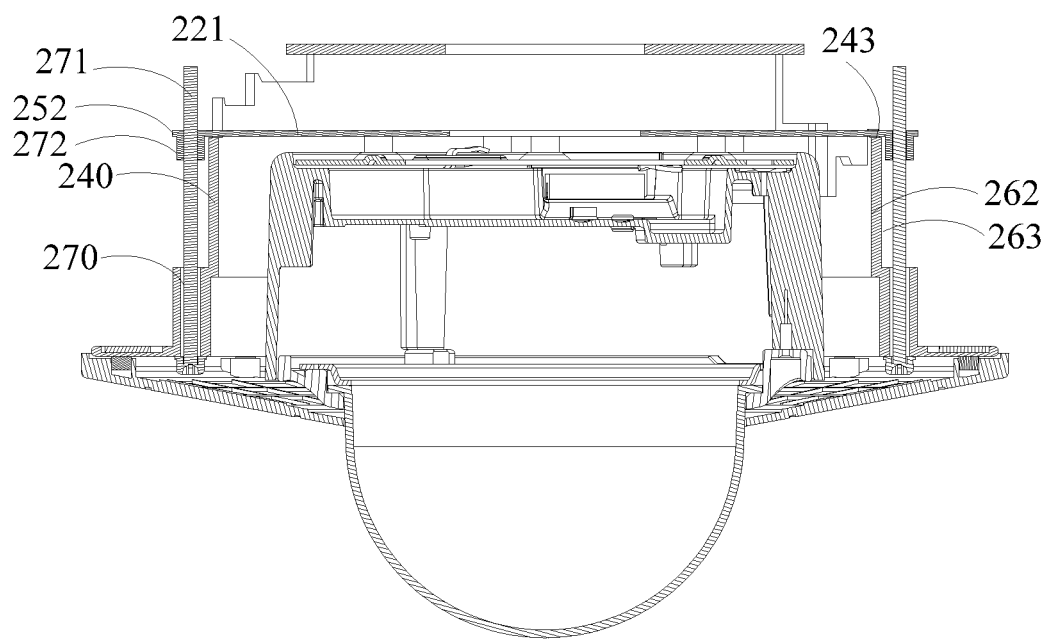
FIG. 11 is a cross-sectional diagram along the line B-B of a camera assembly shown in FIG. 10.
Figure 12:
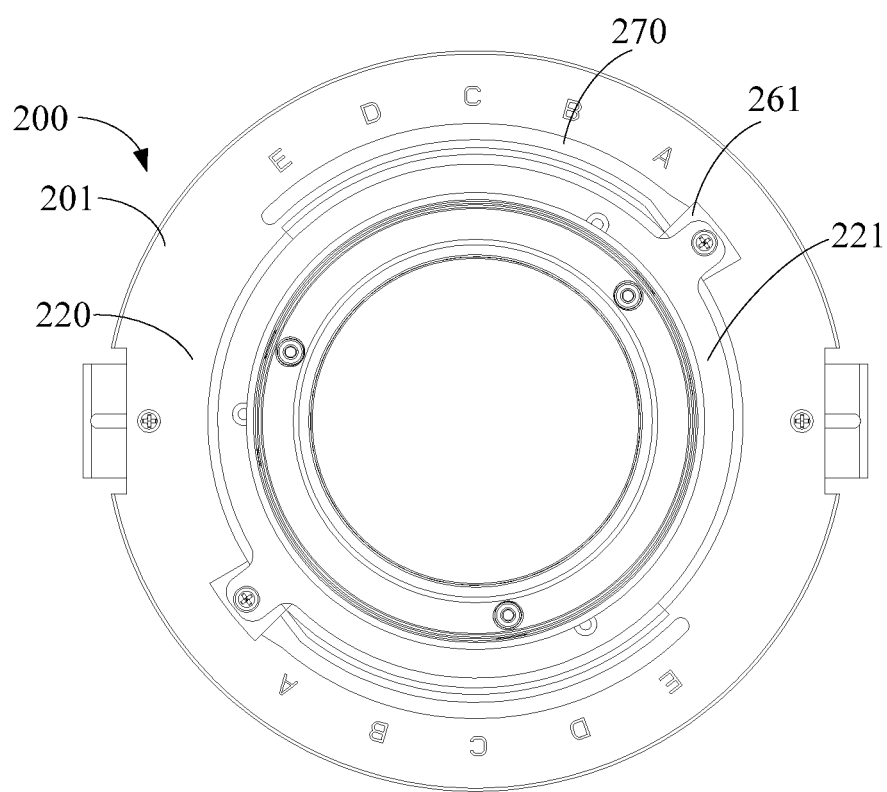
FIG. 12 is a bottom view of a state of a camera assembly shown in FIG. 9.
Figure 13:
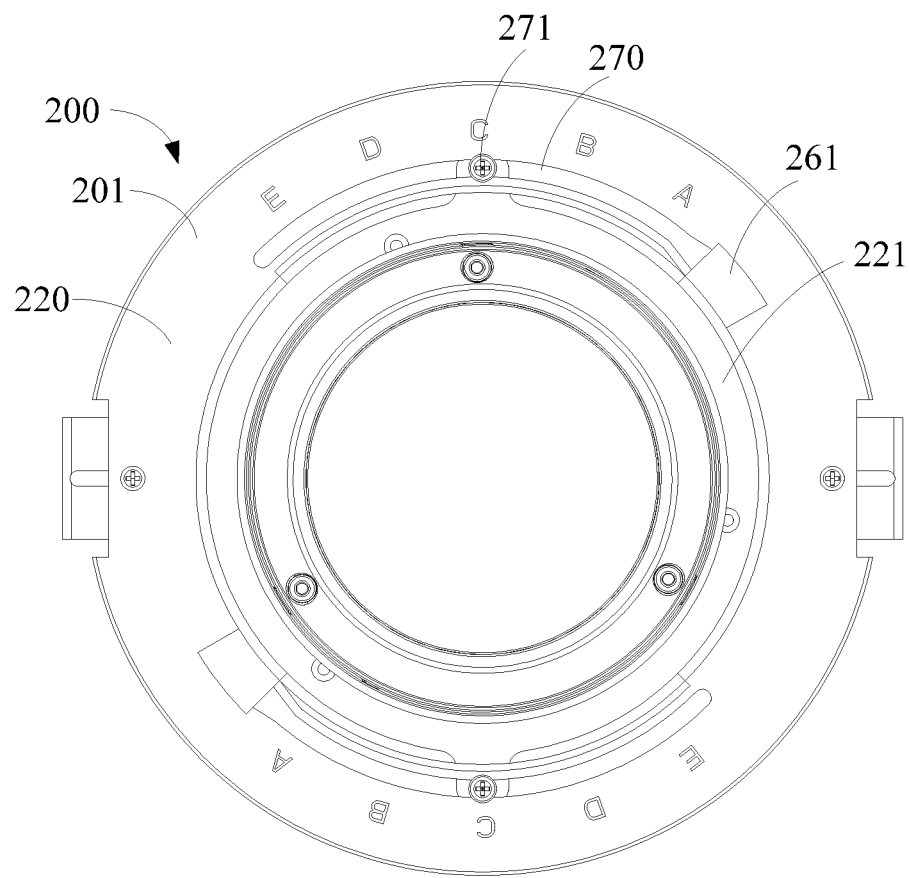
FIG. 13 is a bottom view of another state of a camera assembly shown in FIG. 9.

FIG. 9 is a schematic diagram of another embodiment of a camera assembly 200. FIG. 10 is an exploded perspective diagram of a camera assembly 200 shown in FIG. 9. FIG. 11 is a cross-sectional diagram along the line B-B of a camera assembly 200 shown in FIG. 10. FIG. 12 is a bottom view of a state of a bracket body 220 and a mounting member 221 of a camera assembly 200 shown in FIG. 9. FIG. 13 is a bottom view of another state of a bracket body 220 and a mounting member 221 of a camera assembly 200 shown in FIG. 9.

The camera assembly 200 shown in FIGS. 9-13 is similar to the camera assembly 100 shown in FIGS. 1-8, and compared to the camera assembly 100 shown in FIGS. 1-8, the bracket body 220 of the embedded mounting bracket 201 of the camera assembly 200 shown in FIGS. 9-13 includes a through-type adjustment groove 270, the adjustment groove 270 communicates with the guide groove 261 and extends along the outer side of the bracket side wall 240. The mounting member 221 includes a locking member 271 that is locked with the locking part 252. The locking member 271 slides into the adjusting groove 270 from the guide groove 261 to lock the locking part 252 and the adjusting groove 270, so that the locking part 252 is fixed on the step surface 243.

The guide groove 261 penetrates through the upper end surface 242 and the lower end surface 241 of the bracket side wall 240, and penetrates through the inner surface 262 and the outer surface 263 of the bracket side wall 240. The locking part 252 extends from the guide groove 261 to the outside of the bracket side wall 240, and the locking part 252 can move from the guide groove 261 to the upper end surface 242 of the bracket side wall 240, and reach above the step surface 243. The locking member 271 is aligned with the guide groove 261, extends longitudinally into the guide groove 261, and is located outside the bracket side wall 240. The mounting member 221 is rotated relative to the bracket body 220, and the locking member 271 is rotated into the adjusting groove 270, as shown in FIG. 13. The locking part 252 is rotated to the corresponding scale, such as "A", "B", "C", "D" or "E". After the locking part 252 is placed on the step surface 243 of the corresponding height, the locking member 271 is locked, and the mounting member 221 is fixed to the bracket body 220, so as to realize the mounting.

In some embodiments, the locking part 252 includes a rivet post 272, and the locking member 271 includes a bolt, one end of the bolt abuts against a lower edge of the adjusting groove 270, and the other end of the bolt is screwed into the rivet post 272, which has a simple structure and is easy to operate. In some embodiments, the side wall of the adjustment groove 270 extends from the lower end surface 241 of the bracket body 220 in the direction of the upper end surface 242, and the side wall of the adjustment groove 270 has a certain height, which can stabilize the locking member 271 and make the bracket 271 with a longer length firmly lock the bracket body 220 and the mounting member 221. The length of the locking member 271 is relatively long, which can adapt to the step surfaces 243 with different heights. The side wall of the adjustment groove 270 is lower than the height of the step surface 243. In some embodiments, the arc of the adjustment groove 270 is less than 180°, and the rotation angle of the mounting member 221 is less than 180°, so as to reduce or avoid the occurrence of wire throwing, wire winding, etc. In some embodiments, the rotation angle of the mounting member 221 may not exceed 100°. In one embodiment, the radian of the adjustment groove 270 does not exceed 100°, which can reduce or avoid the occurrence of wire winding.

In some embodiments, the step surface 243 is protruded upward with a limiting protrusion 273, as shown in FIG. 9, the locking part 252 located on the step surface 243 is limited in the circumferential direction, so as to prevent the locking part 252 from rotating and sliding away from the step surface 243. The limiting protrusion 273 is located on one side of the step surface with a higher height close to the adjacent step surface with a lower height.

The description is only for preferred embodiments of the present application, and embodiments are not so limited. Any modifications, substitutions, improvements, etc., which are made within the spirit and principles of the present application, will fall into the protection scope of the present application.

What is claimed is:

1. An embedded mounting bracket, which is used for mounting a camera, the embedded mounting bracket comprises:

a bracket body comprising a bracket side wall, wherein the bracket side wall includes a lower end surface and an upper end surface opposite to the lower end surface, and the upper end surface comprises multiple step surfaces with different heights from the lower end surface; and a mounting member, which is detachably assembled to the bracket body for bearing the camera, wherein the mounting member is selectively assembled on the step surfaces with different heights, so as to replaceably assemble at least two cameras with different body heights to the bracket body.

2. The embedded mounting bracket of claim 1, wherein the upper end surface comprises multiple sets of the step surfaces, and each set of the step surfaces comprises at least two step surfaces having the same height from the lower end surface, the heights of the multiple sets of the step surfaces from the lower end surface are different, and the mounting member can be selectively assembled to one of the multiple sets of the step surfaces.

3. The embedded mounting bracket of claim 2, wherein the multiple sets of the step surfaces are arranged in a circumferential direction, and the mounting member is rotatably assembled to the step surfaces.

4. The embedded mounting bracket of claim 3, wherein each set of the step surfaces comprises at least one pair of step surfaces symmetrically distributed in a radial direction, and/or a rotation angle of the mounting member is less than or equal to 180 degrees.

5. The embedded mounting bracket of claim 1, wherein the mounting member comprises a mounting body for mounting the camera and a locking part extending outward from the mounting body, the bracket body comprises a guide groove, the guide groove penetrates through the upper end surface and the lower end surface of the bracket side wall and penetrates through an inner surface of the bracket side wall, the mounting body is located inside the bracket side wall, and the size of the guide groove is configured to allow the locking part to move from the lower end surface to the upper end surface along the guide groove.

6. The embedded mounting bracket of claim 5, wherein the guide groove penetrates through the outer surface of the bracket side wall, and the size of the guide groove is configured to allow the locking part to extend out of the bracket side wall from the guide groove.

7. The embedded mounting bracket of claim 6, wherein the bracket body comprises a through-type adjustment groove, the adjustment groove communicates with the guide groove and extends along the outer side of the bracket side wall, the mounting member comprises a locking member that is locked with the locking part, the locking member slides into the adjusting groove from the guide groove to lock the locking part and the adjusting groove, so that the locking part is fixed on the step surfaces.

8. The embedded mounting bracket of claim 7, wherein the locking part comprises a rivet post, and the locking member comprises a bolt, one end of the bolt abuts against a lower edge of the adjusting groove, and the other end of the bolt is screwed into the rivet post.

9. The embedded mounting bracket of claim 1, wherein the mounting member comprises a mounting body for fixing the camera and a locking part extending outward from the mounting body, the step surface is provided with a locking fastener which locks the locking part.

10. The embedded mounting bracket of claim 9, wherein the locking fastener comprises a connecting part extending from the step surfaces in a direction away from the step surfaces, and a clamping part that is bent from the connecting part and extends along one side of the connecting part, the locking part of the mounting member is clamped between the clamping part and the step surfaces; and/or
the locking part comprises a support part extending from the mounting body and a limit part that is bent and extends from the support part, the support part is clamped to the locking fastener, and the limit part is limited to the outside of the bracket side wall.

11. The embedded mounting bracket of claim 2, wherein the mounting member comprises a mounting body for mounting the camera and a locking part extending outward from the mounting body, the bracket body comprises a guide groove, the guide groove penetrates through the upper end surface and the lower end surface of the bracket side wall and penetrates through an inner surface of the bracket side wall, the mounting body is located inside the bracket side wall, and the size of the guide groove is configured to allow the locking part to move from the lower end surface to the upper end surface along the guide groove.

12. The embedded mounting bracket of claim 3, wherein the mounting member comprises a mounting body for mounting the camera and a locking part extending outward from the mounting body, the bracket body comprises a guide groove, the guide groove penetrates through the upper end surface and the lower end surface of the bracket side wall and penetrates through an inner surface of the bracket side wall, the mounting body is located inside the bracket side wall, and the size of the guide groove is configured to allow the locking part to move from the lower end surface to the upper end surface along the guide groove.

13. The embedded mounting bracket of claim 4, wherein the mounting member comprises a mounting body for mounting the camera and a locking part extending outward from the mounting body, the bracket body comprises a guide groove, the guide groove penetrates through the upper end surface and the lower end surface of the bracket side wall and penetrates through an inner surface of the bracket side wall, the mounting body is located inside the bracket side wall, and the size of the guide groove is configured to allow the locking part to move from the lower end surface to the upper end surface along the guide groove.

14. The embedded mounting bracket of claim 2, wherein the mounting member comprises a mounting body for fixing the camera and a locking part extending outward from the mounting body, the step surface is provided with a locking fastener which locks the locking part.

15. The embedded mounting bracket of claim 3, wherein the mounting member comprises a mounting body for fixing the camera and a locking part extending outward from the mounting body, the step surface is provided with a locking fastener which locks the locking part.

16. The embedded mounting bracket of claim 4, wherein the mounting member comprises a mounting body for fixing the camera and a locking part extending outward from the mounting body, the step surface is provided with a locking fastener which locks the locking part.

\* \* \* \* \*